2,891,002

INHIBITOR SWEETENING PROCESS FOR HYDROCARBON OIL IN THE PRESENCE OF AN ORGANIC DISPERSING AGENT

Rolland G. Bowers, Toledo, Ohio, assignor to Sun Oil Company, Philadelphia, Pa., a corporation of New Jersey No Drawing. Application September 23, 1957
Serial No. 685,372

2 Claims. (Cl. 208—189)

This invention relates to sweetening sour hydrocarbon distillates, and more particularly to a manner of providing improved contact of the hydrocarbons with the inhibitor sweetening agents during the operation.

It is well known in the art to sweeten sour hydrocarbon distillates by contact with phenylene diamine compounds in the presence of an alkaline catalyst. The sweetening process is believed to involve oxidation of mercaptans to disulfides, by gaseous oxygen, catalyzed by the phenylene diamine compounds and the alkaline material.

Inhibitor sweetening, as this method of sweetening has come to be known in the art, is usually performed by intimately admixing the hydrocarbons, phenylene diamine compound and alkaline material, and introducing the mixture into a storage tank. The alkaline material, e.g. aqueous caustic soda, settles out during the storage period unless special means are provided to prevent the settling. According to one manner of operation in the prior art, the alkaline material is recirculated from the bottom of the storage tank to the inlet and remixed with the hydrocarbon material in order to provide sufficiently intimate contact during the sweetening period, which will usually be within the approximate range from 12 to 144 hours. The recirculation technique provides improved, but not optimum, contact between hydrocarbons and inhibitor sweetening agents.

According to the present invention, a novel manner is provided of obtaining good contact between the hydrocarbons and inhibitor sweetening agents during the sweetening period. This result is obtained according to the invention by carrying out the sweetening operation in the presence of an added oil-soluble, basic amino nitrogen-containing addition copolymer of (1) an amine-free ethylenically unsaturated compound having 8 to 18 carbon atoms in an acyclic chain and (2) an ethylenically unsaturated compound containing an amino group. The copolymer functions to promote dispersion of the alkaline material in the hydrocarbons, thereby obtaining intimate contact of the components of the reaction mixture and promoting the sweetening reactions.

The copolymer employed according to the invention contains substituent groups on the main polymer chain, which groups are free of nitrogen atoms and contain 8 to 18 carbon atoms. The copolymers contain other substituents on the main polymer chain, which substituents contain amino groups. The copolymers are formed for example by reacting a monomer such as octadecyl methacrylate, the octadecyl group providing the amine-free radical, and a monomer such as beta-diethylaminoethyl methacrylate, the diethylaminoethyl radical providing the amine-containing substituent.

The copolymers employed according to the invention constitute a known class of materials. This class and a representative number of members thereof are disclosed in W. E. Catlin United States Patent No. 2,737,496, issued March 6, 1956. The members of the class are generally capable of promoting dispersion of alkaline materials employed in inhibitor sweetening in the hydrocarbon phase of the inhibitor sweetening system. Examples of suitable amine-free monomers which can be employed in preparing the copolymers for use according to the invention include decyl acrylate, 3,5,5 - trimethylhexyl methacrylate, 9-octadecenyl methacrylate, vinyl stearate, methyl lauryl fumarate, N-octadecyl acrylamide, dodecylstyrene, etc. Examples of amine-containing monomers which can be employed include beta-diethylaminoethyl styrenes, vinyl pyridines, 2-vinyl-5-ethyl pyridine, 4-diethylaminocyclohexyl methacrylate, beta - methylaminoethyl acrylate, beta-aminoethyl vinyl ether, beta-diethylaminoethyl vinyl ether, N-(beta-dimethylaminoethyl)-acrylamide, diallylamine, etc. Other monomers can be additionally employed in the polymerization if desired, as described in the patent referred to previously.

The amount of polymer employed according to the process of the invention is an amount sufficient to promote dispersion of the alkaline material in the hydrocarbon phase. Generally, a greater intimacy and permanence of dispersion are obtained when using relatively large amounts of the polymer. The amount employed is preferably that which is sufficient to produce a dispersion which will be permanent throughout the sweetening period under the conditions involved in the sweetening process, but not so great as to make it excessively difficult to separate the alkaline material from the hydrocarbons at the end of the sweetening period. In the light of the present specification, a person skilled in the art can determine a proper amount of polymer to employ in order to obtain these results. Generally, the amount will be within the approximate range from 0.01 to 1.0 weight percent based on the hydrocarbon phase.

The known phenylene diamine compounds for use in inhibitor sweetening are generally suitable for use according to the invention. The most commonly used compound is N-N'-di-secondary-butyl-p-phenylene diamine. Other suitable phenylene diamine compounds include N,N' - di - isopropyl - p - phenylene diamine, N,N' - di - secondary - amyl - p - phenylene diamine, N-isopropyl - N' - secondary - butyl - p - phenylene diamine, N - iso - propyl - N' - secondary - amyl - p - phenylene diamine, N - secondary - butyl - N' - secondary - amyl - p - phenylene diamine, etc. The amount of phenylene diamine compound employed is generally within the approximate range from 0.0001 to 1.0 weight percent based on hydrocarbons, more preferably, 0.001 to 0.1 weight percent.

The alkaline material which is employed in the process according to the invention is one of the known alkaline materials for use in inhibitor sweetening. Examples of suitable alkaline materials are ammonia, the hydroxides of the alkali metals or alkaline earth metals, e.g. sodium, potassium, calcium, strontium, barium, etc. and organic basic compounds which are substantially insoluble in hydrocarbons, e.g. polyamines such as diethylene triamine, triethylene tetramine, tetraethylene pentamine, 1,2-diaminopropane, 1,3-diaminobutane, 1,3,5- triaminopentane, 1,3,6 - triaminohexane, 1,3,5,7 - tetraminoheptane, etc., aminoalcohols including aminoethanol, diaminopropanol, triaminobutanol, tetraminopentanol, etc. and quaternary ammonium compounds including tetramethyl ammonium hydroxide, tetraethyl ammonium hydroxide, tetrapropyl ammonium hydroxide, tetramethyl ammonium methoxide, tetramethyl ammonium ethoxide, tetraethyl ammonium ethoxide, etc.

The amount of alkaline material which is employed in the process of the invention is preferably within the approximate range from 0.01 to 5 weight percent, although any amount known to be suitable for use in inhibitor sweetening operations can be employed.

The temperature conditions of the sweetening operation according to the invention can be those which are employed in the conventional sweetening operations.

Preferably, relatively low temperatures, e.g. in the range from 50° F. to 125° F., are employed in order to favor the dispersion of the alkaline material in the hydrocarbons. However, higher temperatures, e.g. up to 200° F. or higher can be employed if desired.

In one embodiment, the process according to the invention is carried out without recirculation of alkaline material or other means for agitating the materials in the sweetening zone. The amount of polymer present is chosen to provide maintenance of a dispersion of alkaline material in hydrocarbons during a substantial portion of the sweetening period, and preferably throughout the sweetening period, with separation of the alkaline material from the hydrocarbons at some time during the sweetening period or preferably at the end of the sweetening period. Generally the length of time during which the dispersion persists is proportional to the amount of polymer which is present. Therefore, by choosing the proper amount of polymer, it is possible to obtain the desired length of time during which the dispersion persists. In the light of the present specification, a person skilled in the art can select a proper amount of polymer to be employed in a given instance.

In another embodiment, the sweetening process is carried out with recirculation of alkaline material or with other agitation means. The presence of the polymer provides better dispersion of the alkaline material in hydrocarbons during the sweetening period than can be obtained with the same agitation means in the absence of the polymers. At the conclusion of the sweetening period, the agitation is terminated, and the alkaline material separates from the hydrocarbons.

Any suitable means can be employed if desired to assist in the separation of phases at the end of the sweetening period. For example, the materials in the sweetening zone can be subjected to elevated temperature in order to promote the resolution of dispersion. If desired, known demulsifying agents can be added to the mixture of materials to promote the resolution of the dispersion.

The following example illustrates the invention:

The following materials are intimately admixed in the indicated proportions:

| | Parts by weight |
|---|---|
| Gasoline | 100 |
| N,N'-di-secondary-butyl-phenylene diamine | 0.01 |
| 10% aqueous sodium hydroxide | 0.1 |
| Copolymer of n-octyl methacrylate and beta-diethylaminoethyl methacrylate | 0.01 |

The gasoline is a 62° A.P.I., 400° F. endpoint, catalytically cracked and caustic-pretreated gasoline containing about 0.01 weight percent mercaptan sulfur.

The copolymer of octyl methacrylate $$C_8H_{17}OOCC(CH_3)=CH_2$$

and diethylaminoethyl methacrylate $$(C_2H_5)_2NC_2H_4OOCC(CH_3)=CH_2$$

is prepared by heating 47.5 parts of the former and 2.5 parts of the latter with 0.25 part of alpha,alpha'-azodiisobutyronitrile in a polymerization reactor under an atmosphere of oxygen-free nitrogen at 58° C. for 18 hours while bubbling nitrogen through the mixture. An oil-soluble, tacky resinous copolymer is obtained containing the monomers in about 95:5 proportions.

The inhibitor sweetening mixture is stored in a tank for 96 hours at 75° F. The above-described copolymer promotes dispersion of the aqueous sodium hydroxide in the gasoline and reduces the tendency of the aqueous sodium hydroxide to settle out. The mixture is agitated by conventional recirculation technique during the sweetening period, and this agitation is, because of the presence of the copolymer, capable of maintaining better dispersion throughout the period than in the absence of the polymer.

At the conclusion of the sweetening period, the agitation is terminated, and the aqueous sodium hydroxide separated from the gasoline, which is doctor sweet.

Generally similar results to those obtained in the preceding example are obtained employing other copolymers within the scope of the invention, such as those disclosed in the examples of the patent referred to previously. Generally similar results are also obtained employing other alkaline materials such as those disclosed previously.

The invention claimed is:

1. Process for sweetening hydrocarbons which comprises: contacting sour hydrocarbons with an inhibitor sweetening agent and oxygen in the presence of an oil-soluble basic amino nitrogen-containing addition copolymer of (1) an amine-free ethylenically unsaturated compound having 8 to 18 carbon atoms in an acyclic chain and (2) an ethylenically unsaturated compound containing an amino group, said copolymer promoting dispersion of said agent in said hydrocarbons.

2. Process according to claim 1 wherein the first-named unsaturated compound is n-octyl methacrylate and the second-named unsaturated compound is diethylaminoethyl methacrylate.

References Cited in the file of this patent

UNITED STATES PATENTS

| 2,616,831 | Rosenwald | Nov. 4, 1952 |
| 2,737,496 | Catlin | Mar. 6, 1956 |